Nov. 23, 1948.    L. W. THOMPSON ET AL    2,454,582
EXCITATION SYSTEM FOR ALTERNATING
CURRENT DYNAMOELECTRIC MACHINES
Filed Aug. 27, 1946
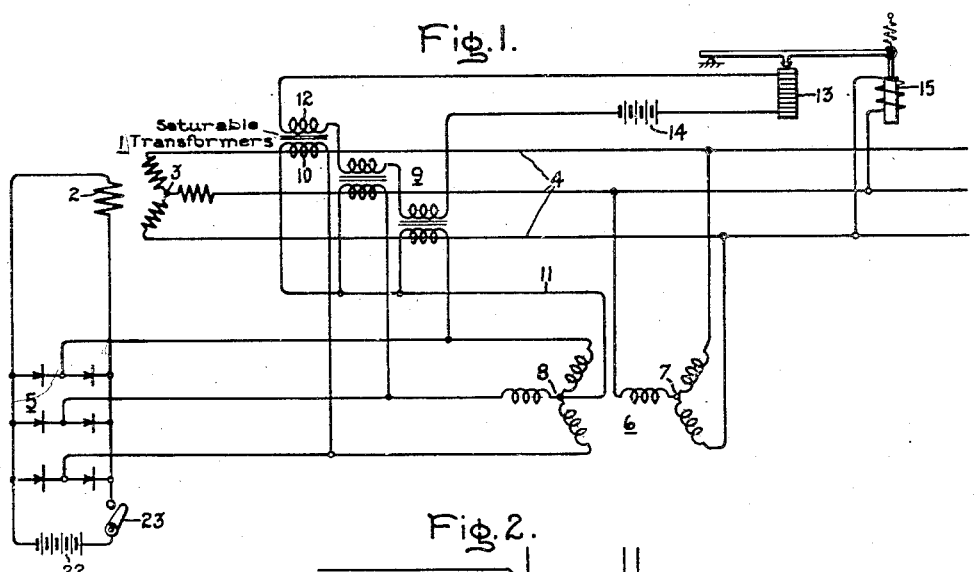
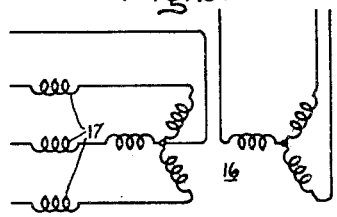
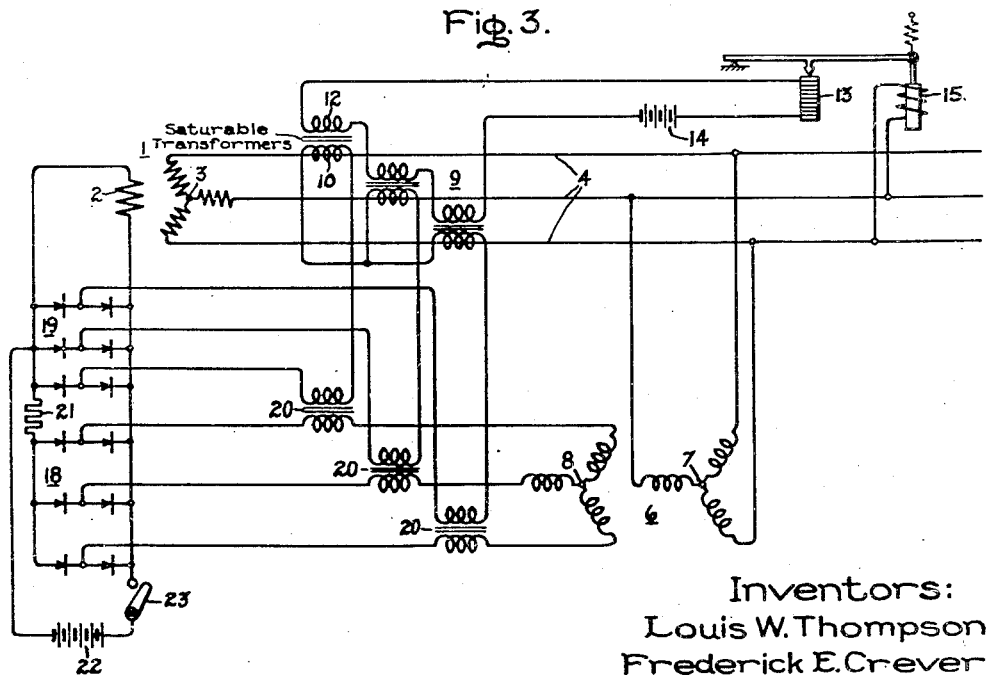
Inventors:
Louis W. Thompson,
Frederick E. Crever,
by Prowell & Mack
Their Attorney.

Patented Nov. 23, 1948

2,454,582

UNITED STATES PATENT OFFICE 2,454,582

EXCITATION SYSTEM FOR ALTERNATING CURRENT DYNAMOELECTRIC MACHINES

Louis W. Thompson, Schenectady, and Frederick E. Crever, Scotia, N. Y., assignors to General Electric Company, a corporation of New York Application August 27, 1946, Serial No. 693,222

11 Claims. (Cl. 322—25)

This invention relates to an excitation system for alternating current dynamo-electric machines and more particularly to an improved automatic self-excitation and regulating system for alternating current electric generators.

While it has been well known in the past that control and regulating apparatus could be provided for alternating current dynamo-electric machines so that their field windings would be excited by direct current supplied through rectifiers from the alternating current circuit of the machine, self-excitation system of this type have not been commercially adopted to any large extent. However, recent improvements in rectifying apparatus and in regulating systems together with a desire to eliminate the more complex conventional field excitation and regulating systems, such as the dynamo-electric exciter, have made the use of self-excited machines, employing either the dry type rectifiers or electronic type of rectifiers, practical, simple and economical.

In a field excitation system of the rectified alternating current type as applied to alternators, it is necessary that the direct current supplied to the alternator field be closely regulated as a function of output current and voltage and also power factor so that the proper amount of field current will be supplied to the alternator to maintain these output conditions at the rated or desired level. Such a system should also be inherently self-regulating requiring a minimum of maintenance or attention once the initial adjustments or settings have been made and the generator placed in operation.

It is, therefore, an object of this invention to provide a new and improved field excitation system for alternating current dynamo-electric machines.

Another object of this invention is to provide an improved system for self-excitation of synchronous generators which is entirely automatic in its generator output regulating action.

It is a further object of this invention to provide an improved self-excitation system of the static type for synchronous generators which is simple, economical, and provides very close regulation of generator output, voltage and power factor.

This invention will be better understood from the following description taken in connection with the accompanying drawing, and its scope will be pointed out in the appended claims.

In the drawing, Fig. 1 represents diagrammatically a preferred embodiment of this invention as applied to a conventional three-phase synchronous generator; Fig. 2 illustrates a modification of one of the features shown in Fig. 1, and Fig. 3 represents an alternative arrangement of the system shown in Fig. 1.

Referring now to the drawing and more particularly to Fig. 1, there is shown therein, by way of example, a three phase synchronous generator 1 having a conventional rotating field winding 2 and armature windings 3 connected to supply alternating current energy to an external load or power system through the line conductors 4. While we have shown this system as applied to a three phase alternating current generator, it will be understood that the invention is equally applicable to single phase synchronous generators, or generators having any other desired number of output phases. The synchronous generator 1 is arranged to be driven at a comparatively constant speed by any suitable form of prime mover (not shown).

Energizing current for the field winding 2 of the generator is supplied from the output terminals of the three phase full wave rectifier bridge, shown generally at 5. While we prefer to use the dry type of rectifier such as the copper oxide or the selenium rectifier unit in the three phase rectifier bridge 5, the invention is not limited to this particular type of rectifier and will operate equally as well with any other suitable type such as the electronic or vacuum tube rectifier. Recent improvements in the design and performance of dry type rectifiers, such as the copper oxide or selenium types, have increased the output capacity and life of such units to the point where they are very satisfactory for furnishing the necessary field exciting current even for synchronous machines of large capacity.

The alternating current energy that is supplied to the input terminals of the rectifier bridge 5 is composed of two components, the first, an output voltage proportional component supplied from the V-connected high reactance potential transformer 6 which has its primary winding 7 connected to the output circuit 4 of the alternator and its secondary winding 8 connected to the input terminals of the rectifier bridge 5. The rectifier is thus supplied with alternating current energy varying directly with the output voltage of the generator, thus the generator field excitation is progressively increased during conditions of increasing terminal voltage. A second component of alternating current energy proportional to generator output or load current is supplied to the rectifier bridge 5 from the current transformers 9 which are shown diagrammatically as being of the type wherein the primary winding is a straight section of the conductor 4 carrying the load current, and having secondary windings 10 connected to the input terminals of the rectifier bridge and in parallel with the secondary windings of the high reactance potential transformer 6. Thus the rectifier 5 is supplied with alternating current energy from the current transformers which, except for saturation of the transformers which will be subsequently described, is directly proportional to the output load current being supplied by the generator 1.

In connection with the dual supply of alternating current energy to the rectifier bridge, it should be noted that one terminal of each of the secondary windings 10 of the current transformers 9 are connected together to the common conductor 11 which is then connected to the neutral point of the Y-connected high reactance potential transformer 6. This arrangement introduces a phase relation between the output voltages of the potential transformer 6 and the current transformer 10, so that the respective voltages are displaced by 90° under the condition of unity power factor on the alternator. Thus when the alternator is operating under a condition of lagging power factor, the voltage output of the current transformers 9 will form an angle with the voltage output of the potential transformer 6 of less than 90°, and the result will be an in-phase component of voltage additive to the voltage of the potential transformer, thereby raising the total voltage that is applied to the input of the rectifier bridge 5. Thus the output of the rectifier is consequently increased, increasing the excitation of the field winding 2 and supplying necessary additional field excitation for operation under conditions of lagging power factor in the synchronous generator. In the case of a leading power factor on the system 4, the voltage of the current transformers will swing to a position wherein it is displaced more than 90° from the voltage output of the voltage transformers and the in-phase component of the current transformer voltage in this case is subtractive with respect to the potential transformer component of voltage, thereby decreasing the net alternating current voltage supplied to the rectifier bridge and reducing the excitation of the field winding 2 for conditions of leading power factor in the synchronous generator 1. It will be seen that the system as thus far described is self-compensating for changes in power factor existing in the alternating current generator 1.

Since the input to the rectifier bridge 5 is composed of a component proportional to alternator terminal voltage and also a second component proportional to alternator load current, it will be evident that the field excitation will be varied in accordance with both voltage and current conditions existing in the output circuit of the alternator, and thus will be automatically corrected for variations in either one from the predetermined standard.

In operation of the system it has been found advisable to adjust the outputs of the voltage transformer 6 and the current transformers 9 to provide a field current slightly greater than that required to hold normal voltage on the synchronous generator, and then provide auxiliary means for regulating the field excitation current more closely about the desired level. This is accomplished by providing a third saturating winding 12 on the current transformers 9 and supplying this saturating winding 12 with a direct current that varies in direct proportion to the alternator output voltage. Any suitable form of conventional voltage regulator may be used to supply the voltage proportional saturating current to the windings 12, and we have illustrated diagrammatically one example of a simple form of carbon pile voltage regulator having a carbon pile 13 placed in series with a source of direct current, such as a battery 14, and with the saturating windings 12 of the current transformers 9. The regulator as shown is mechanically arranged so that an increase in generator voltage will cause compression of the carbon pile 13, thus decreasing the resistance of the pile instead of increasing its resistance as in the usual form of carbon pile regulator. The resistance of the carbon pile is varied by the change in force exerted by the solenoid 15 which is energized in accordance with the output voltage existing on the circuit 4. Thus for an increase in generator voltage across the circuit 4, the armature is drawn further into the solenoid and pressure is applied to the carbon pile, thereby decreasing its resistance and increasing the amount of direct current caused to flow through the windings 12 of the current transformers 9 and increasing the saturation of the current transformers. Variations in current in the winding 12 will change the amount of saturation present in the core of the current transformer, thereby changing its impedance or effectively changing the ratio of transformation in the transformer.

As in the case previously mentioned, an increase in generator terminal voltage effects an increase in saturating current in the windings 12, thereby decreasing the impedance of the current transformers 9 and causing a reduction in output of the current transformers 9. The increase in saturation is analogous to removal of the magnetic core from the transformer, thereby reducing the coupling and consequently greatly reducing the output of the current transformer secondary winding 10. The reduced current transformer output results in reduced input to the rectifier bridge 5 and a proportional decrease in direct exciting current to the field winding 2 of the generator. With this type of saturable current transformer control, it has been found that very close voltage regulation may be held on the synchronous generator since the system is inherently regulated by means of the current and voltage response to a point near the desired level, and the final adjustment is then accomplished by means of the variations in saturation of the current transformers 9. An essential part of this invention lies in the use of the high reactance potential transformer which acts as feedback control, presenting a high impedance from its secondary side and preventing energy from the current transformers 9 from feeding back into the main output circuit 4. The high reactance potential transformer 6 is preferably constructed with loose coupling between the primary and secondary windings so that its effective impedance to an impressed voltage from another source is considerably higher than the effective input impedance of the rectifier bridge 5.

In Fig. 2 we have shown a modified arrangement that can be substituted with equally satisfactory results for the high reactance potential transformer. In Fig. 2 a conventional potential transformer 16 is employed having normal low reactance windings closely coupled and in order to prevent feedback from the current transformers 9, series reactors 17 are placed in series with the secondary windings of the potential transformer so that the effective impedance of the circuit including the potential transformer 16 and series reactor 17 is correspondingly increased and exceeds the input impedance of the rectifier bridge 5.

The operation of the alternative arrangement shown in Fig. 3 is essentially the same as that shown in Fig. 1 and previously described. However, in Fig. 3 a double rectifier bridge is employed having one full wave rectifier bridge 18 supplied by the voltage proportional component from the potential transformer 6 and a second full wave rectifier bridge 19 being supplied by the current proportional component from the current transformers 9. In order to provide power factor compensation as is accomplished in Fig. 1, coupling transformers 20 are inserted in the rectifier input circuits having one winding in series with the output of the potential transformer 6 and the other winding in series with the secondary windings 10 of the current transformers 9. Thus the vector relations between the voltage output of the potential transformer 6 and the current transformers 9 are maintained in the same relation as accomplished with the circuit shown in Fig. 1. If desired, an equalizing and current limiting resistor 21 may be inserted in the direct current field circuit between the rectifier bridges 18 and 19, to insure that the required direct current load division is maintained between the rectifier bridges.

It is desirable to use a grade of magnetic material in the construction of the alternator that will maintain sufficient residual magnetism so that alternator voltage will build up to a predetermined minimum value when the machine is started. As it requires a certain minimum voltage to overcome the resistance of the rectifier bridge 5, unless the residual voltage is great enough to overcome this resistance, the alternator will not build up. In such cases it may be desirable to provide an auxiliary source of direct current for momentary energization of the field winding 2 during the starting operation. This may be accomplished as shown in both Figs. 1 and 3 wherein we have provided a battery 22 and a manually operated switch 23 in series with the field winding. Thus if the residual magnetism in the alternator structure is not sufficient to cause voltage to build up to a point where the rectifier bridge will pass current to the field winding 2, thus continuing the building up process until normal voltage is obtained, the operator may close the switch 23 for a short period of time, thus temporarily exciting the field winding 2 from the battery 22 and insuring that alternator voltage will reach a sufficient value so that self-excitation through the rectifier bridge will take place.

The system as shown is subject to numerous modifications which will occur to those skilled in the art such as the use of an anti-hunting circuit in connection with the particular type of voltage regulator that may be used, or the use of three phase response to the voltage regulator by means of a positive phase sequence network. In addition, frequency compensation may be added to the voltage regulator circuit if extremely critical regulation is required.

From the foregoing it will be seen that we have provided a system of self-excitation for syncronous generators which is simple and accurate and which will function to maintain output voltage of the alternator very closely to the desired level. The system is automatically compensated for changes in alternator load current as well as alternator power factor and it, as previously described, the alternator is constructed of a grade of iron such that sufficient residual magnetism will be retained, the system is entirely automatic in its starting operation.

While we have shown and described particular embodiments of our invention, it will be obvious to those skilled in the art that changes and modifications may be made without departing from our invention in its broader aspects, and we, therefore, aim in the appended claims to cover all such changes and modifications as fall within the true spirit and scope of our invention.

What we claim as new and desire to secure by Letters Patent of the United States is:

1. A regulating system for an alternating current dynamo-electric machine comprising, an armature circuit, a field winding, a rectifier for supplying direct current to said field winding, means for supplying alternating current energy from said armature circuit to said rectifier, said means including a current transformer having a direct current saturating winding for supplying alternating current energy to said rectifier proportional to the current of said armature circuit, direct current supply means for said direct current saturating winding, and means responsive to armature circuit voltage for varying said direct current supplied to said saturating winding.

2. A regulating system for a self-excited alternating current generator comprising, a field winding for said generator, a rectifier for supplying direct current to said field winding, means for supplying alternating current energy from said generator output to said rectifier, said means including a current transformer having a direct current saturating winding for supplying alternating current energy to said rectifier proportional to the load current of said generator, direct current supply means for said direct current transformer winding, and means responsive to generator output voltage for varying said direct current supplied to said saturating winding to vary the effective ratio of transformation of said current transformer.

3. In a regulating system for a synchronous generator having a field winding, rectifier means for supplying unidirectional current to said field winding, means for supplying alternating current energy from said generator output to said rectifier means, said alternating current supply means including a high reactance transformer for supplying alternating current energy to said rectifier means proportional to generator terminal voltage and a saturable transformer for supplying alternating current energy to said rectifier means proportional to generator load current, and means responsive to generator output voltage for varying the saturation and effective transformation ratio of said current transformer.

4. A regulating system for a synchronous generator having a field winding comprising, rectifier means for supplying unidirectional current to said field winding, means for supplying alternating current energy from said generator output to said rectifier means, said alternating current supply means including a high reactance transformer for supplying alternating current to said rectifier means proportional to generator terminal voltage and a current transformer having a direct current saturating winding for supplying alternating current to said rectifier means proportional to generator load current, a source of direct current for said saturating winding, and means responsive to generator output voltage for varying the energization of said saturating winding.

5. A regulating system for a synchronous generator comprising, a field winding for said generator, rectifier means for supplying unidirectional current to said field winding, means for supplying alternating current energy from the output of the generator to said rectifier means, said alternating current energy supply means including a high reactance transformer for supplying alternating current energy to said rectifier means proportional to generator terminal voltage and a transformer having a direct current saturating winding for supplying alternating current energy to said rectifier means proportional to generator load current, means for supplying direct current to said saturable winding, and means responsive to generator voltage for directly varying the value of direct current supplied to said saturable winding.

6. A regulating system for a synchronous generator comprising, a field winding for said generator, rectifier means for supplying unidirectional current to said field winding, means for supplying alternating current energy from said generator output to said rectifier means, said alternating current energy supply means including a potential transformer for supplying alternating current energy to said rectifier means proportional to generator terminal voltage and a saturable transformer for supplying alternating current to said rectifier means proportional to generator load current, an impedance device interposed between said potential transformer and said rectifier means, means for supplying direct current to said saturable transformer, and means responsive to generator voltage for directly varying the value of direct current supplied to said saturable transformer.

7. A regulating system for an alternating current dynamo-electric machine comprising, an armature circuit, a field winding, excitation means for said field winding including a plurality of rectifier units connected in parallel circuit relationship, a plurality of electrical transformer means for supplying alternating current energy from said armature circuit to said rectifier units, inductive coupling means interposed between said electrical transformer means, and means responsive to armature circuit voltage for varying the effective ratio of transformation of one of said electrical transformer means.

8. A regulating system for an alternating current generator comprising, a field winding for said generator, excitation means for said field winding including a first rectifier unit and a second rectifier unit connected in parallel circuit relationship, first transformer means for supplying alternating current energy to said first rectifier unit, a direct current saturating winding on said first transformer means, a second transformer means for supplying alternating current energy to said second rectifier unit, and means responsive to generator voltage for varying the value of direct current supplied to said saturating winding of said first transformer means.

9. A regulating system for a self-excited alternating current synchronous generator having a field winding comprising, excitation means for said field winding including a first rectifier unit and a second rectifier unit connected in parallel circuit relationship, first transformer means for supplying alternating current energy proportional to generator current to said first rectifier unit, a direct current saturating winding on said transformer means, a second transformer means for supplying alternating current energy proportional to generator voltage to said second rectifier unit, and means responsive to generator voltage for varying the value of direct current supplied to said saturating winding effective to vary the ratio of transformation of said first transformer means.

10. A regulating system for a self-excited alternating current synchronous generator comprising, a field winding for said generator, excitation means for said field winding including a first rectifier unit and a second rectifier unit connected in parallel circuit relationship, first transformer means for supplying alternating current energy to said first rectifier unit, a direct current saturating winding on said first transformer means, a second transformer means for supplying alternating current energy to said second rectifier unit, inductive coupling means having one winding in series with said first rectifier unit and a second winding in series with said second rectifier unit, and means responsive to generator voltage for varying the value of direct current supplied to said saturating winding of said first transformer means.

11. In a regulating system for a self-excited alternating current generator having a field winding, a rectifier connected to supply unidirectional current to said field winding, means including a high reactance transformer for supplying alternating current energy to said rectifier proportional to the output voltage of said generator, means including a current transformer having a direct current saturating winding for supplying alternating current energy to said rectifier proportional to the load current of said generator, said direct current saturating winding being arranged for energization from a source of direct current, and means responsive to the output voltage of said generator for varying the direct current excitation of said saturating winding, thereby to vary the transformation ratio of said current transformer.

LOUIS W. THOMPSON.
FREDERICK E. CREVER.

REFERENCES CITED

The following references are of record in the file of this patent:

FOREIGN PATENTS

| Number | Country | Date |
|---|---|---|
| 834,163 | France | Nov. 15, 1938 |

Certificate of Correction

Patent No. 2,454,582. November 23, 1948.

LOUIS W. THOMPSON ET AL.

It is hereby certified that error appears in the printed specification of the above numbered patent requiring correction as follows:

Column 2, line 42, for "V-connected" read Y-*connected*;

and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*